United States Patent
Broder et al.

(10) Patent No.: US 6,269,362 B1
(45) Date of Patent: Jul. 31, 2001

(54) SYSTEM AND METHOD FOR MONITORING WEB PAGES BY COMPARING GENERATED ABSTRACTS

(75) Inventors: Andrei Zary Broder, Menlo Park; Steven Charles Glassman, Mountain View; Mark Steven Manasse, San Francisco, all of CA (US)

(73) Assignee: Alta Vista Company, Palo Alto, CA (US)

(*) Notice: Subject to any disclaimer, the term of this patent is extended or adjusted under 35 U.S.C. 154(b) by 0 days.

(21) Appl. No.: 08/994,939

(22) Filed: Dec. 19, 1997

(51) Int. Cl.[7] .................................................. G06F 17/30
(52) U.S. Cl. ...................... 707/4; 707/1; 707/3; 707/10; 707/511
(58) Field of Search ........................... 707/3, 1, 2, 10, 707/102, 511, 4, 200, 513, 500, 100

(56) References Cited

U.S. PATENT DOCUMENTS

| | | | |
|---|---|---|---|
| 3,947,825 | * | 3/1976 | Cassada ................................. 707/3 |
| 5,649,186 | * | 7/1997 | Ferguson ............................. 707/10 |
| 5,715,441 | * | 2/1998 | Atkinson et al. ..................... 707/1 |
| 5,758,358 | * | 5/1998 | Ebbo ................................... 707/203 |
| 5,774,845 | * | 6/1998 | Ando et al. .......................... 704/231 |
| 5,787,424 | * | 7/1998 | Hill et al. ............................ 707/6 |
| 5,806,078 | * | 9/1998 | Hug et al. ............................ 707/511 |
| 5,832,474 | * | 11/1998 | Lopresti et al. ..................... 707/2 |
| 5,835,087 | * | 11/1998 | Herz et al. .......................... 345/327 |
| 5,835,905 | * | 11/1998 | Pirolli et al. ........................ 707/3 |
| 5,860,071 | * | 1/1999 | Ball et al. ............................ 707/100 |
| 5,898,836 | * | 4/1999 | Freivald ............................... 709/218 |
| 5,905,979 | * | 5/1999 | Barrows .............................. 707/1 |
| 5,933,604 | * | 8/1999 | Inakoshi .............................. 709/206 |
| 6,012,083 | * | 1/2000 | Savitzky et al. ..................... 709/202 |
| 6,029,175 | * | 2/2000 | Chow wt al. ........................ 707/104 |
| 6,067,541 | * | 5/2000 | Raju et al. ........................... 707/3 |
| 6,092,091 | * | 7/2000 | Sumita et al. ....................... 707/530 |

OTHER PUBLICATIONS

Broder, Some applications of Rabin's fingerprinting method, Sequences II: Methods in Communications, Security, and Computer Science, Springer–Verlag, pp. 1–10, 1993.
Carter et al., Universal Classes of Hash Functions, Journal of Computer and System Sciences 18, pp. 143–154, 1979.
Rabin, Probablistic Algorithms in Finite Fields, SIAM J. Comput., vol. 9, No. 2, pp. 273–280, 1980.

* cited by examiner

*Primary Examiner*—Jean R. Homere
*Assistant Examiner*—Greta L Robinson
(74) *Attorney, Agent, or Firm*—Fenwick & West LLP

(57) ABSTRACT

Provided is a computerized method for monitoring the content of documents. A set of documents is stored in memories of server computers. The server computers can be connected to each other by a network such as the Internet. Entries are generated in a search engine for each document of the set. The search engine is also connected to the Internet. The entries are in the form of a full word index of the set of documents. The search engine also maintains a first abstract for each document that is indexed. The abstract is highly dependent on the content of each document. For example, the abstract is in the form of a sketch or a feature vector. Periodically a query is submitted to the search engine. The query locates a result set of documents that satisfy the query. A second abstract is generated for each document member of the result set. The first and second abstracts are compared to identify documents that have changed between the time the set of documents were indexed and the time the result set is generated.

18 Claims, 3 Drawing Sheets

SYSTEM AND METHOD FOR MONITORING WEB PAGES BY COMPARING GENERATED ABSTRACTS

FIELD OF THE INVENTION

This invention relates generally to clipping services, and more particularly to automatically monitoring electronically stored documents using queries.

BACKGROUND OF THE INVENTION

For many organizations and institutions, it is common to use a clipping service to monitor topics of interest in conventional print media. For example, companies often employ a clipping service to monitor what the print media is publishing about a company or its products.

More recently, clipping services have started to monitor electronic media as well. In a simple semi-automated monitoring system, queries that define what is to be monitored are periodically submitted to one or more Web search engines. In order to get a good "recall," the queries may be constructed to retrieve as many relevant pages as possible.

One widely used electronic publishing media is the Internet's World-Wide-Web (the "Web"). A service eWatch offers to monitor documents retrievals, please see, "http://www.ewatch.com." The eWatch service claims to monitor some 40,000 public bulletin boards and preselected Web sites for some four-hundred of the world's largest corporations. There, a key first step is to identify which sites are relevant to a particular client. Because Web pages at the selected sites are retrieved on a daily basis to check whether anything has changed or not, this could become quite expensive when the number of monitored sites is large.

Dartmouth University offers a Web clipping service called the Informant at "http://informant.dartmouth.edu/." This free service only monitors the top ten relevant pages for a particular query plus any Web pages at a preselected set (a maximum of 35 pages per user) of Universal Resource Locators (URL). The service computes a hash value for each current page being monitored, and compares the hash value with the hash value of a previous version of the page. If the hash values are different, the content of the Web page has probably changed. The service is limited in the number of pages that are monitored, and even trivial changes to a Web page will change the hash value so that the Web page is flagged as "interesting."

In general, monitoring pre-selected sites is relatively easy, however, monitoring the entire Web, or even a large portion of the Web is a much more difficult problem. The number of Web sites is easily counted in the millions, with a large proportion of those sites having pages that change on a frequent basis. Active Web "publishers" may change pages on a daily basis, in many cases trivially.

Therefore, the output from the search engine can be quite large. Because humans will eventually have to read and analyze the output it is desirable to mechanically filter the output as much as possible. In particular it is necessary to eliminate pages that have not changed or have not substantially changed since the last retrieval.

SUMMARY OF THE INVENTION

Provided is a computerized method for monitoring the content of documents. A set of documents is stored in memories of server computers. The server computers can be connected to each other by a network such as the Internet. Entries are generated in a search engine for each document of the set. The search engine is also connected to the Internet. The entries are in the form of a full word index of the set of documents. The search engine also maintains a first abstract for each document that is indexed. The abstract is highly dependent on the content of each document. For example, the abstract is in the form of a sketch or a feature vector.

Periodically a query is submitted to the search engine. The query locates a result set of documents that satisfy the query. A second abstract is generated for each document member of the result set. The first and second abstracts are compared to identify documents that have changed between the time the set of documents were indexed and the time the result set is generated.

DETAILED DESCRIPTION OF THE PREFERRED EMBODIMENT

Figure 1:
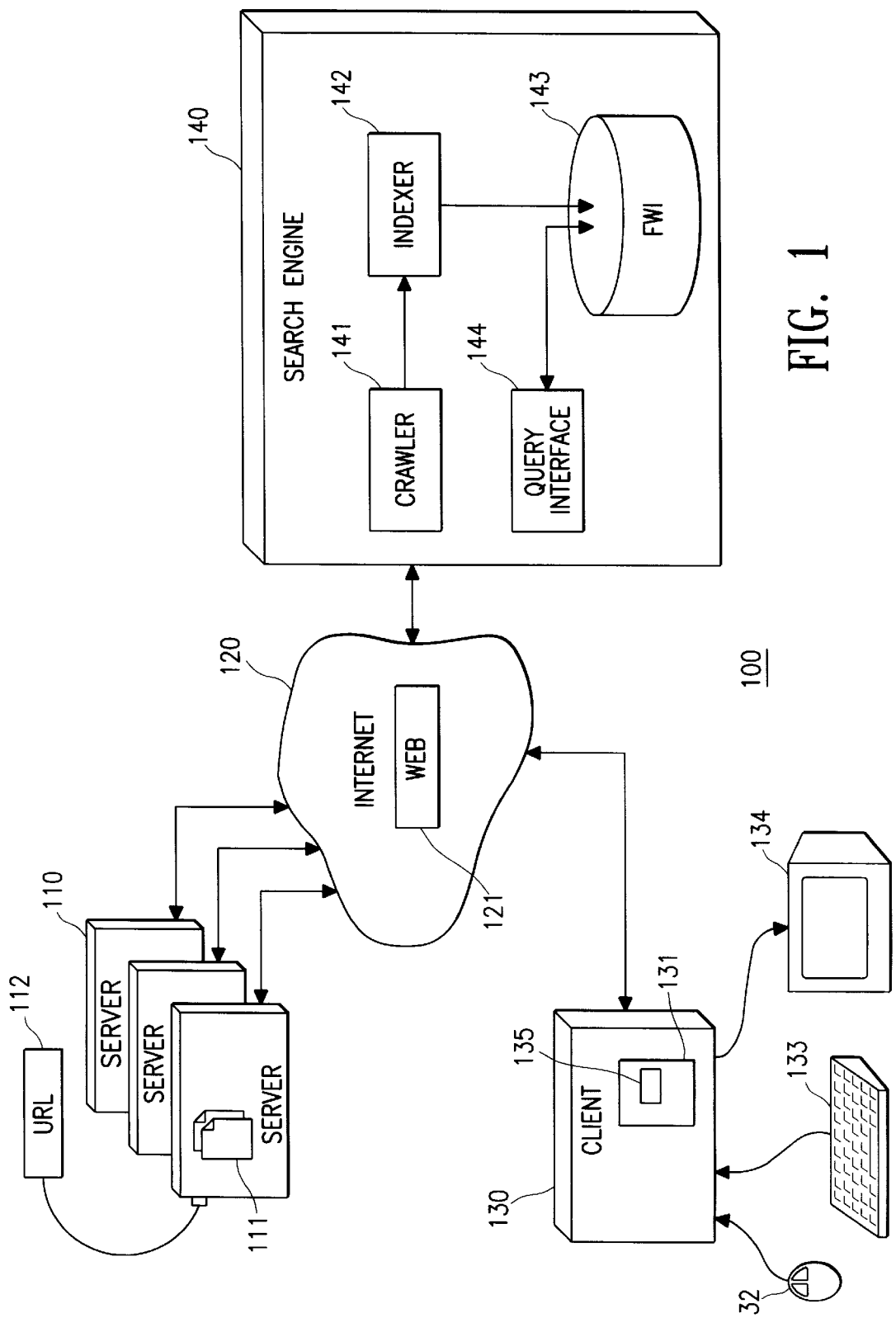
FIG. 1 is a block diagram of distributed computer system that uses the monitoring service according to the invention.

FIG. 1 shows an arrangement 100 which can use the automated electronic document monitoring service according to the invention. A plurality of server computers 110 are connected to each other by a communications network 120, for example, the Internet. The Internet includes an application level interface called the World-Wide-Web (Web 121). The server computers 110 maintain multimedia content 111, for example, HTML Web pages and bulletin boards. The location of any content 111 is specified by its Universal Resource Locator (URL) address 112.

Also connected to the network 120 are client computers 130. A client computer 130 typically is a lap-top, personal computer, or workstation having input/output (I/O) devices such as a mouse 132, a keyboard, and a monitor 134. Usually, each client 130 is also equipped with a Web browser 131 such as the Netscape Navigator, or the Microsoft Internet Explorer. During operation of the arrangement 100, users of the clients 130 desire to monitor the content 111 of the servers 110. More particularly, the users may want to monitor specific content that has changed in a substantial way.

In order to assist the users of the client computers to locate Web content 111, one or more search engines 140 are also connected to the network 120. A particular search engine 140, for example Digital Equipment Corporation's AltaVista search engine, includes a Web spider 141 that periodically scans the "Web" for changed or new content. An indexer 142 maintains a full word index (FWI) 143 of content located by the spider 141. The search engine 140 is also equipped with a query interface 144 to process queries submitted by the users to quickly locate indexed content. The users of the clients 130 interact with the query interface 144 by downloading the search engine's home page 135 into the browser 131.

Figure 2:
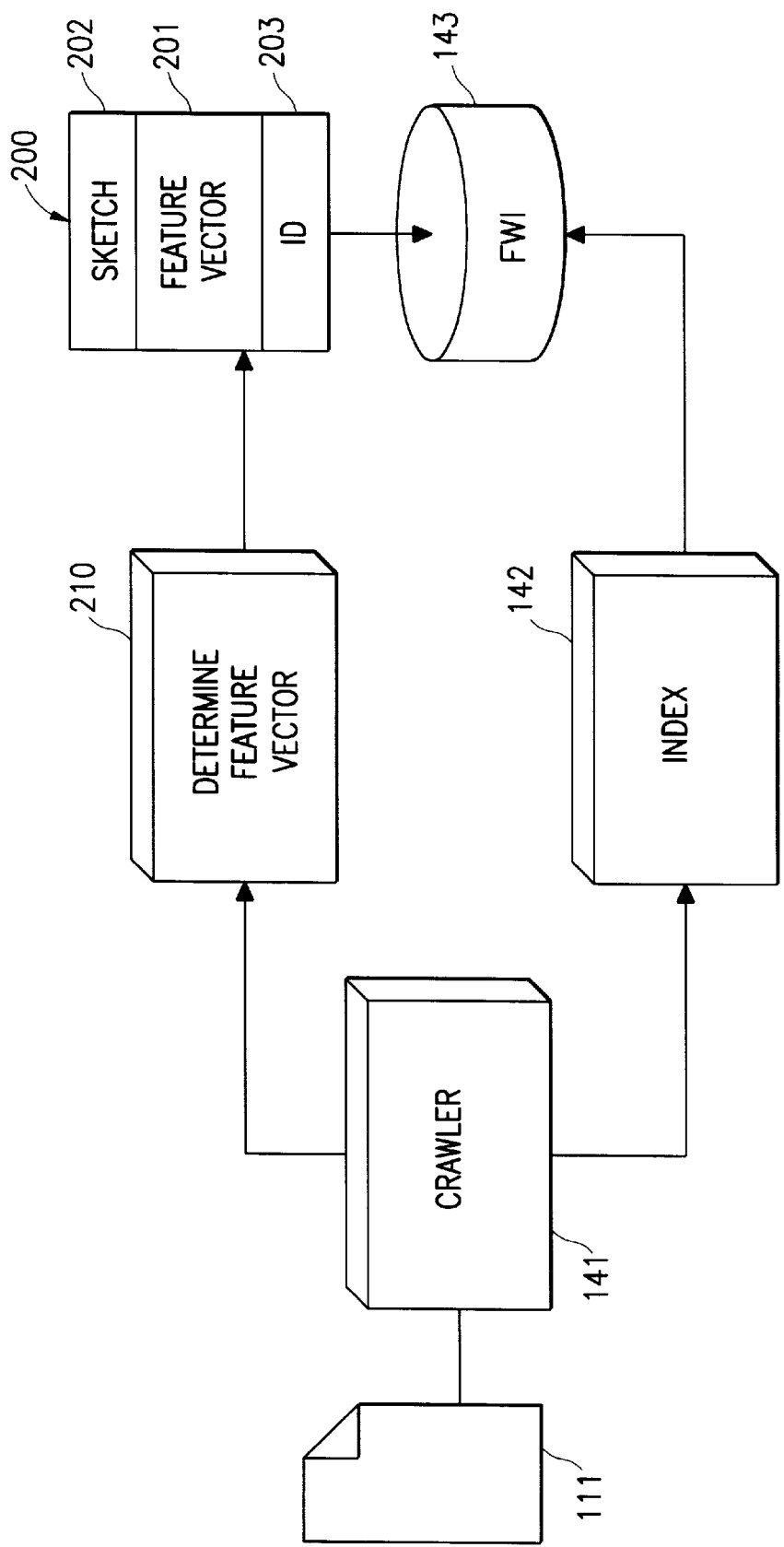
FIG. 2 is flow diagram of a process for determining a feature vector for electronically stored documents.

As shown in FIG. 2, the search engine 140 is enhanced to provide an improved automated clipping service. For every document 111 which is retrieved and indexed by the search engine 140, a "content abstract" 200 is determined. Here, "abstract" means some bit or byte string which is highly dependent on the content of the document.

The abstract 200 can be a feature vector 201, or a "sketch" 202 of the underlying content 111. The feature vector and/or sketch 200 can be stored in the FWI 143, or some other storage, using the same identification (ID) 203 as used for identifying the indexed content in the FWI from which they were extracted, for example, some representation of the content's URL.

The sketch 201 can be relatively short, for example, a couple of hundred bytes. The sketches for a particular document can be determined in a time which is directly proportional to the size of the documents.

In addition to comparing resemblance estimates derived from sketches, it is also possible to determine whether the resemblance between documents is greater than some predetermined threshold by using feature vectors. As an advantage, feature vectors require less storage than sketches. The feature vectors can be computed very fast, for example, less than 1.5 microseconds per document-word on a 300 MHZ Digital Equipment Corporation Alpha computer.

Here, the idea is to build a very short vector of features for each document. For example, each vector includes six features of eight bytes each, e.g., 64 bytes per vector. If two documents are roughly the same, then there is a high probability that the two vectors for the documents will have a certain number of features in common. For example, when two documents have more than two features in common, the likelihood of the documents resembling each other is very high. More precisely, with 64 byte feature vectors, the probability that two documents that have 77% resemblance have two common features is less than 1%, and the probability that two documents that have 97% resemblance do not have two common features is less than 1%.

Figure 3:
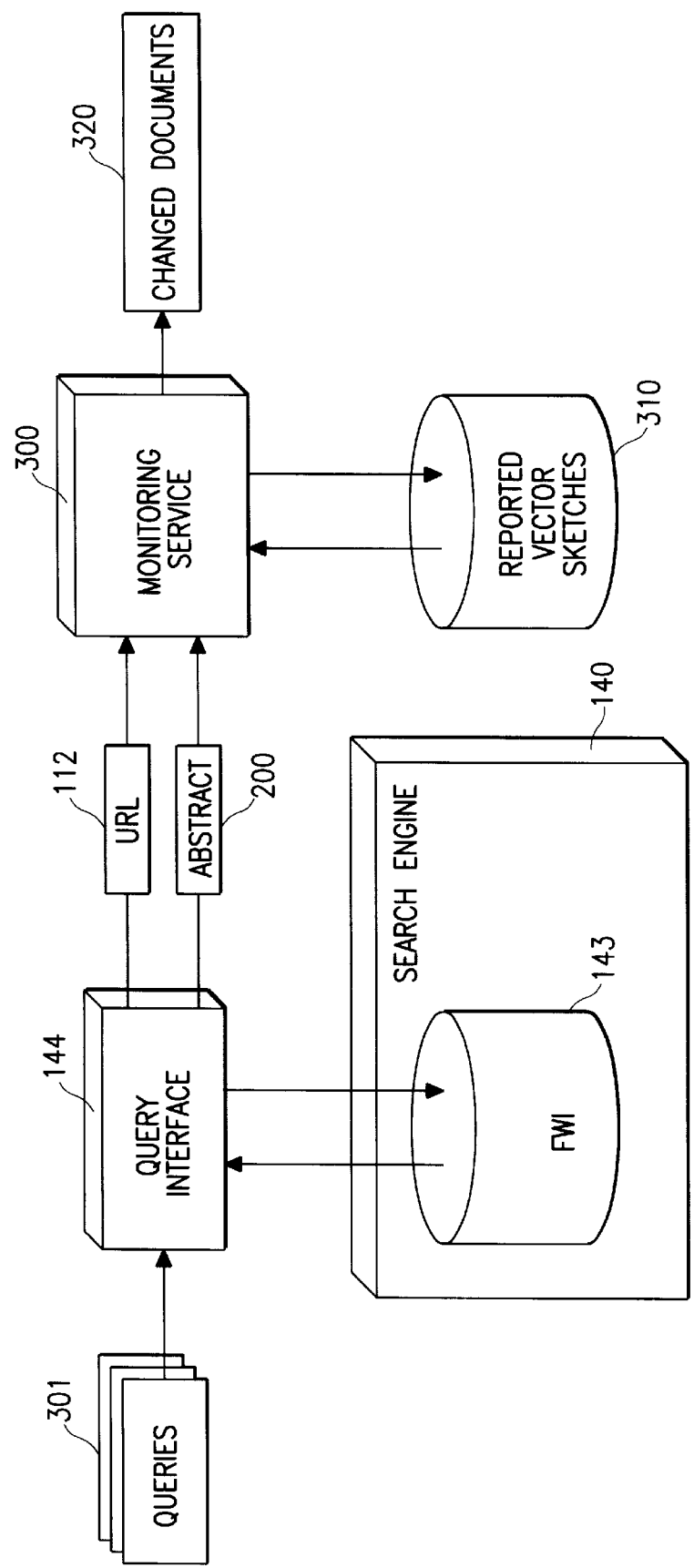
FIG. 3 is a flow diagram of a query interface for detecting changed documents.

As shown in FIG. 3, the query monitoring service 300 keeps track of the abstracts 200 (sketches and feature vectors) associated with previously reported documents in a data structure 310. Periodically, queries 301 relevant to the monitoring service 300 are submitted to the query interface 144. In response, the monitoring service 300 receives, from the search engine 140, the current abstracts 200 of documents which are relevant to the queries 301. The monitoring service 300 can then report documents 320 which have changed a significant amount to the users of the monitoring service.

It is in fact possible to compute a small sketch of say 100 bytes, such that these small sketches can be used to estimate resemblance pair-wise, although such sketches are too small to do document clustering. With small sketches, the time to determine which documents resemble above a certain threshold is almost always quadratic in the number of documents under consideration. However if the number of relevant documents for a particular query is small, say under 1000 documents, then such a quadratic cost might be acceptable. Another possible use for small sketches is to use first a resemblance, and to compute a better estimate only for the pairs that have more than 75% resemblance, using the feature vector.

In principle, the monitoring service 300 can use more than one search engine as long as each search engine provides the abstract of each document. Furthermore, the monitoring service can retrieve current copies of the underlying documents from the server computers 110. In this case, the feature vector will be for the current state of the document, and not what the search engine determined the last time it crawled the Web.

It is understood that the above-described embodiments are simply illustrative of the principles of the invention. Various other modifications and changes may be made by those skilled in the art which will embody the principles of the invention and fall within the spirit and scope thereof.

What is claimed is:

1. A computerized method for monitoring a set of documents resulting from a first query, the documents stored in memories of server computers, comprising the steps of:
   submitting the first query to the search engine, the first query generating a result set of documents corresponding to the first query;
   generating a first abstract for each member of the set in a search engine, the first abstract including a feature vector and being highly dependent on the features of the document;
   submitting a second query to the search engine, the second query generating a result set of documents corresponding to the second query;
   generating a second abstract for each member of the result set, the second abstract being a feature vector and being highly dependent on the features of the document; and
   comparing the first abstract with the second abstract to identify documents that have changed between the time the set of documents was generated and the time the result set is generated.

2. A computerized method for monitoring a set of documents resulting from a first query, the documents stored in memories of server computers, comprising the steps of:
   submitting a first query to the search engine, the first query generating a result set of documents corresponding to the first query;
   generating a first abstract for each member of the result set in a search engine, wherein the first abstract is a sketch of the document and is highly dependent on the features of the document;
   submitting a second query to the search engine, the second query generating a result set of documents corresponding to the second query;
   generating a second abstract for each member of the result set, wherein the second abstract is a sketch of the document and being highly dependent on the features of the document; and
   comparing the first abstract with the second abstract to identify documents that have changed between the time the set of documents was generated and the time the result set is generated.

3. The method of claim 1, wherein the first query is resubmitted to the search engine at predefined intervals.

4. The method of claim 1, wherein the first query is exactly the same as the second query.

5. A computerized method for monitoring a previously generated set of documents corresponding to a query from an end user, comprising:
   submitting the query to a search engine;
   receiving from the search engine a result set of documents and a result set of abstracts corresponding to the result set of documents, the abstracts including feature vectors and being highly dependent on the features of the documents;
   comparing the result set of abstracts to a previous set of abstracts corresponding to the previously generated set of documents to identify documents that have changed between the time the previous set of abstracts was generated and the time the result set of abstracts was generated; and
   notifying the end user of the changed documents.

6. The method of claim 5, wherein the query is resubmitted at predefined intervals to the search engine.

7. The method of claim 5, wherein a plurality of search engines are queried.

8. A computerized method for communicating with a query monitoring service comprising:
   retrieving documents stored in server computers connected to each other by a network;
   generating entries in a search engine, the entries in a form of a full word index, corresponding to the documents;
   generating abstracts corresponding to the documents, the abstracts including feature vectors and being highly dependent on the features of the documents;
   receiving a query from the query monitoring service;
   locating a result set of documents that satisfy the query;
   sending entries, the entries in a form of a full word index, corresponding to the result set of documents to the query monitoring service; and
   sending abstracts corresponding to the result set of documents to the query monitoring service.

9. A computer system integrating a query monitoring service that communicates with at least one search engine, comprising:
   a) a query monitoring service including:
      a software portion configured to receive queries from end users,
      a software portion configured to submit the queries to at least one search engine at predefined intervals,
      a software portion configured to receive from at least one search engine a result set of documents and a corresponding set of abstracts, the abstracts including feature vectors and being highly dependent on the features of the documents,
      a software portion configured to compare the set of abstracts to previous sets of abstracts to identify documents that have changed, and
      a software portion configured to notify end users of the changed documents; and
   b) at least one search engine, each search engine having:
      a spider that periodically scans a plurality of server computers for changed or new documents,
      a query interface that processes queries submitted by the query monitoring service,
      a software portion configured to generate abstracts for each of the documents, and
      a software portion configured to deliver a result set of documents and a corresponding set of abstracts to the query monitoring service.

10. A query monitoring service computer system, comprising:
   a software portion configured to receive queries from end users;
   a software portion configured to submit the queries to at least one search engine at predefined intervals;
   a software portion configured to receive from at least one search engine a result set of documents and a corresponding set of abstracts, the abstracts including feature vectors and being highly dependent on the features of the documents;
   a software portion configured to compare the set of abstracts to previous sets of abstracts to identify documents that have changed; and
   a software portion configured to notify end users of the changed documents.

11. A computer program product comprising:
   a computer usable medium having computer readable program code means embodied in the medium for monitoring documents corresponding to a query from an end user, the computer program product including:
   computer readable program code means to receive the query from the end user;
   computer readable program code means to submit the query to at least one search engine at predefined intervals;
   computer readable program code means to receive from at least one search engine a set of documents and a corresponding set of abstracts, the abstracts including feature vectors and being highly dependent on the features of the documents;
   computer readable program code means to compare the set of abstracts to previous sets of abstracts to identify documents that have changed; and
   computer readable program code means to notify the end user of the changed documents.

12. The computer program product of claim 11, further comprising:
   a computer usable medium having computer readable program code means embodied in the medium for communicating with a query monitoring service, the computer program product including:
   computer readable program code means to periodically scan a plurality of server computers for changed or new documents;
   computer readable program code means to process queries submitted by the query monitoring service;
   computer readable program code means to generate abstracts for each of the documents, the abstracts including feature vectors and being highly dependent on the features of the documents; and
   computer readable program code means to deliver a result set of documents and a corresponding set of abstracts to the query monitoring service.

13. A computerized method for monitoring a set of documents resulting from a first query, the documents stored in memories of server computers, comprising the steps of:
   submitting the first query to the search engine, the first query generating a result set of documents corresponding to the first query;
   generating a first abstract for each member of the set in a search engine, the first abstract being a feature vector and being highly dependent on the features of the document;
   submitting a second query to the search engine, the second query generating a result set of documents corresponding to the second query;
   generating a second abstract for each member of the result set, the second abstract being a feature vector and being highly dependent on the features of the document; and
   comparing the first abstract with the second abstract to identify documents new in the result set.

14. A computerized method for monitoring a previously generated set of documents corresponding to a query from an end user, comprising:
   submitting the query to a search engine;
   receiving from the search engine a result set of documents and a result set of abstracts corresponding to the result set of documents, the abstracts including feature vectors and being highly dependent on the features of the documents;
   comparing the result set of abstracts to a previous set of abstracts corresponding to the previously generated set of documents to identify documents new in the result set; and
   notifying the end user of the new documents.

15. A computerized method for communicating with a query monitoring service comprising:

retrieving documents stored in server computers connected to each other by a network;

generating entries in a search engine, the entries in a form of a full word index, corresponding to the documents;

generating abstracts corresponding to the documents, the abstracts including feature vectors and being highly dependent on the features of the documents;

receiving a query from the query monitoring service;

locating a result set of documents that satisfy the query;

sending entries, the entries in a form of a full word index, corresponding to the result set of documents to the query monitoring service;

sending abstracts corresponding to the result set of documents to the query monitoring service; and comparing the first abstract with the second abstract to identify documents new in the results set.

16. A computer system integrating a query monitoring service that communicates with at least one search engine, comprising:

a) a query monitoring service including:
   a software portion configured to receive queries from end users,
   a software portion configured to submit the queries to at least one search engine at predefined intervals,
   a software portion configured to receive from at least one search engine a result set of documents and a corresponding set of abstracts, the abstracts including feature vectors and being highly dependent on the features of the documents,
   a software portion configured to compare the set of abstracts to previous sets of abstracts to identify documents new in the result set, and
   a software portion configured to notify end users of the new documents; and b) at least one search engine, each search engine having:
   a spider that periodically scans a plurality of server computers for changed or new documents,
   a query interface that processes queries submitted by the query monitoring service,
   a software portion configured to generate abstracts for each of the documents, and
   a software portion configured to deliver a result set of documents and a corresponding set of abstracts to the query monitoring service.

17. A query monitoring service computer system, comprising:

a software portion configured to receive queries from end users;

a software portion configured to submit the queries to at least one search engine at predefined intervals;

a software portion configured to receive from at least one search engine a result set of documents and a corresponding set of abstracts, the abstracts including feature vectors and being highly dependent on the features of the documents;

a software portion configured to compare the set of abstracts to previous sets of abstracts to identify documents new in the result set; and a software portion configured to notify end users of the new documents.

18. A computer program product comprising:

a computer usable medium having computer readable program code means embodied in the medium for monitoring documents corresponding to a query from an end user, the computer program product including:

computer readable program code means to receive the query from the end user;

computer readable program code means to submit the query to at least one search engine at predefined intervals;

computer readable program code means to receive from at least one search engine a set of documents and a corresponding set of abstracts, the abstracts including feature vectors and being highly dependent on the features of the documents;

computer readable program code means to compare the set of abstracts to previous sets of abstracts to identify documents new in the set; and computer readable program code means to notify the end user of the new documents.

* * * * *